United States Patent [19]

Tobias

[11] 4,239,393
[45] Dec. 16, 1980

[54] OPTICAL DENSITY SCANNING HEAD

[76] Inventor: Philip E. Tobias, 1872 Watson Rd., Abington, Pa. 19001

[21] Appl. No.: 951,149

[22] Filed: Oct. 13, 1978

[51] Int. Cl.³ .......................................... G01N 21/27
[52] U.S. Cl. ................................... 356/407; 250/226
[58] Field of Search .............. 356/404, 406, 407, 419, 356/425; 250/226

[56] References Cited

U.S. PATENT DOCUMENTS

| 2,287,322 | 6/1942 | Nelson | 356/419 |
| 4,003,660 | 1/1977 | Christie, Jr. et al. | 356/425 X |

Primary Examiner—John K. Corbin
Assistant Examiner—Bruce Y. Arnold
Attorney, Agent, or Firm—William E. Cleaver

[57] ABSTRACT

The present device has a housing means which has a central aperture into which there is located a source of white light and a lens arrangement to direct the white light to a focal point which lies just beyond the base of the housing. The housing means has four other apertures formed therein which lie at approximately 45° to the base of the housing and which open into the central aperture so that light reflected from said focal point will be directed through each of said four other apertures. In the preferred embodiment three of said other apertures lie 120° apart and each of these has a different color light filter located therein which receive reflected light from said focal point. In each of said last mentioned apertures the associated color light filter is followed by an infra-red light filter and thereafter by a photosensitive device. Accordingly the present device can direct white light to an area of a sheet of material which is characterized by one or more of the basic colors cyan, magenta and yellow and can produce simultaneously three electrical signals each of which is indicative of the optical density of a different one of the basic colors cyan, magenta and yellow present at said area to which the white light is directed. The fourth aperture normally has a plug therein but when it is removed, the user can make a visual inspection therethrough to see that the white light is properly focused on the area to be monitored.

6 Claims, 3 Drawing Figures

OPTICAL DENSITY SCANNING HEAD

BACKGROUND

Optical densitometers are well known in the graphic arts and are generally used to determine the optical density of a color swatch or an area of a sheet of material which is characterized by one of the basic colors cyan, magenta, or yellow. In the prior art, such optical densitometers have been static densitometers and have usually been composed of a light source, a rotatable color light filter means, and a photosensitive device. The user knew what color he was examining and therefore rotated the correct light filter into position and thereafter physically moved the densitometer to a position to focus the white light on the color swatch or area of the sheet to be examined. The light of course was reflected from the swatch and read by the photosensitive device to provide an electrical signal indicative of the opitcal density being read. The present device goes beyond the static densitometer because it is used in a scanning mode; that is, it looks at many swatches, one after another, and determines virtually instantaneously which of the basic colors is predominant on the swatch and the optical density thereof. The user need not know what colors are being examined as was true in the prior art. As explained in my copending patent application, Ser. No. 951,444, entitled "Color Monitoring System For Use In Creating Colored Displays", filed Oct. 13, 1978, the signals from the present scanning head are compared one with another and the greatest signal indicates the predominant basic color (if the color swatch under examination is a swatch of a basic color; i.e., cyan, magenta or yellow, then the signals will readily indicate which basic color is being examined of the swatch or area being monitored. The optical density of the predominant color is also determined. The foregoing is possible because each of the color filter photosensitive element arrangements (one each is located in a different one of the housing apertures) is particularly associated with a different one of the basic colors cyan, magenta and yellow, so that each of the signals produced by the photosensitive elements is indicative of the optical density of its associated basic color. These signals are produced simultaneously and hence the present head provides information in one viewing of a swatch which indicates the identity of the basic color and its optical density.

SUMMARY

The present device is an optical density determining head. It has a light source located in the center thereof and through a lens system therein, the light is focused at a point just beyond the base of the housing. The head is used to detect the color of a color swatch being monitored and to do this the light is focused on a point on the swatch. Part of the light is absorbed by the swatch (the particular color of the light absorbed depends on the color of the swatch) and part of the remainder of the light is reflected through an opening in the base of the housing and from there into three angularly disposed apertures. In each of these angularly formed apertures there is located a color light filter, followed by an infrared light filter and a photosensitive device. The color light filters respectively pass only red, green and blue light. Accordingly, if the swatch being monitored is a swatch of cyan colored ink, a relatively large amount of the reflected light would pass through the light filters which are designed to respectively pass either green and blue light because the green and blue light would not be absorbed by the cyan swatch. However, very little of the reflected light would pass through the light filter which is designed to pass red light because much of the red light would be absorbed by the cyan swatch. By properly connecting electronic signal amplifiers to the photosensitive devices (to provide a large output signal in response to a small input signal) the small signal generated by the photosensitive device coupled to the red filter would result in a large output signal from the associated amplifier indicating that cyan was being viewed. The housing also has a fourth angularly formed aperture therein through which the user can view whether or not the focused "spot" of white light is striking the swatch or area to be monitored.

The objects and features of the present invention will be better understood from the following description taken in conjunction with the drawings wherein.

Figure 1:
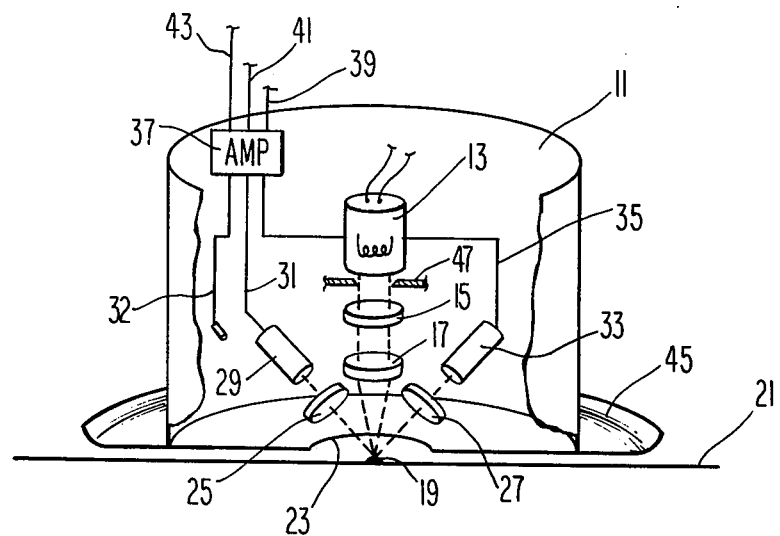
FIG. 1 is a pictorial schematic of the present invention.

Consider FIG. 1. In FIG. 1, there is shown a housing 11 which has been "broken away" to show the elements disposed therein. Inside of the housing 11, as can be gleaned from FIG. 1, there is included a white light source 13. In the preferred embodiment, the white light source is a bulb manufactured by General Electric and identified as a lens end iodine cycle bulb. It should be understood that other types of bulbs can be used. As can be seen in FIG. 1 located below the light source 13 are two lenses 15 and 17. The lens system takes the light from source 13 and directs it to a focal point 19 which lies just below the base of the housing 11. In FIG. 1, the focal point 19 is shown striking the sheet of paper 21 whereon the color swatch, or color area to be monitored, is located.

Part of the white light is absorbed by the swatch on the paper 21 and a good portion is reflected back through the opening 23 of the housing 11. Part of the reflected light entering the opening 23 is directed to three color light filters, two of which are shown in FIG. 1.

There are shown in FIG. 1 two color light filters 25 and 27. Actually there is a third color light filter which is not shown but would lie outward from the paper and whose position can be appreciated by viewing FIG. 3. Let us assume that filter 27 is a red filter to block all light but red light and let us assume that there is a swatch of cyan colored ink lying at point 19 on the paper 21. Under these conditions the red light in the white light coming from the source 13 would be absorbed to a great extent by the cyan swatch. The amount of absorption depends on the optical density of the swatch color which in turn is related to the thickness of the ink.

It should be remembered that the green light and the blue light in the white light will not be absorbed by the cyan swatch so the green light and the blue light are both reflected in large measure. If we assume that the filter 25 is a green filter to block all light but green light, then both the reflected blue and reflected red are blocked by filter 25 and only the green light passes therethrough. Since there was no green light absorbed by the cyan swatch there is a great deal of green light striking the photosensitive device 29 and hence a large output signal on line 31. The output signals on line 32 from the photosensitive device to which the blue light is reflected is also substantially high. At the same time the reflected red light, to filter 27, is relatively small and it passes to the photosensitive device 33 to provide a small output signal on line 35. However, the amplifier circuit 37 responds to a low input signal to provide a high output signal on line 39 and responds to high signal inputs to provide low signals on lines 41 and 43. A magenta swatch would absorb green light and a yellow swatch would absorb blue light.

Accordingly, the present densitometer head provides input signals to a logic system which indicates that the color swatch which is being scanned is of cyan color and has an optical density whose value is proportional to the amplitude of the signal on line 39. Obviously if the swatch had been magenta, the high signal would have been on line 41 and if the swatch had been yellow the high output signal would have been on line 43.

If the swatch under consideration had been black, then the signals on lines 39, 41 and 43 would have been substantially equal. This is because the color black absorbs almost equal amounts of red, green and blue light from white light.

Figure 2:
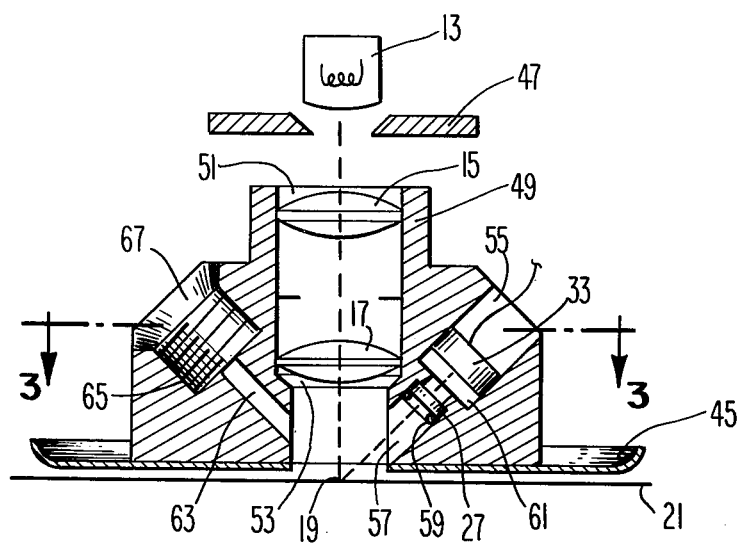
FIG. 2 is a cross section of a part of the housing with two of the angularly formed apertures shown.

As can be seen in FIG. 1, there is a baffle 45 secured to the base of the housing 11. The baffle 45 keeps extraneous light from entering the system and generating spurious signals. In FIG. 1 and FIG. 2 there is shown an aperture 47 which limits the direction of the light toward the lens system and this helps prevent spurious signals from being directed to the photo-sensitive devices.

In FIG. 2 we see a cross-section of part of the housing 11 with two apertures disposed and formed angularly with respect to the central aperture 51 (hereinafter referred to as angularly formed apertures). In FIG. 2 there is shown a metallic section 49 into which there has been cut a central aperture 51. Note that the central aperture 51 has a taper at the location 53 and that the opening passes completely to the bottom of the section 49 and is matched by an opening in baffle 45.

On the right hand side of the section 49 there is an angularly formed aperture 55 which has a lower section 57. Fitted into the lower aperture section 57 is a color light filter 27. The color filter 27, in the preferred embodiment, is a gelatine colored filter, manufactured by Eastman Kodak Company and identified as a wratten filter. The color filter 27 is held in position by an "O" ring 59. The "O" ring 59 can be easily removed to change the color filter 27 if that is desired.

As can be gleaned from FIG. 2, the color filter 27 is followed by an infrared filter 61. The infrared filter blocks the infrared light which is passed by the filter 27. The photosensitive device 33 is shown inserted in the aperture 55 and lying next to the infrared filter 61.

It should be understood that the other two angularly formed apertures have similar arrangements of color light filters, infrared filters and photosensitive devices, with the color light filter being held in place by an "O" ring.

On the left hand side of the section 49 there is shown an angularly formed aperture 63 which fits into a threaded aperture 65. In the threaded aperture there is located a plug 67. When the plug 67 is removed, the user can look down along the aperture 63 to see if the light spot is at point 19. The plug, of course, is normally replaced to block any light from passing down along the aperture 63 to produce spurious signals.

Figure 3:
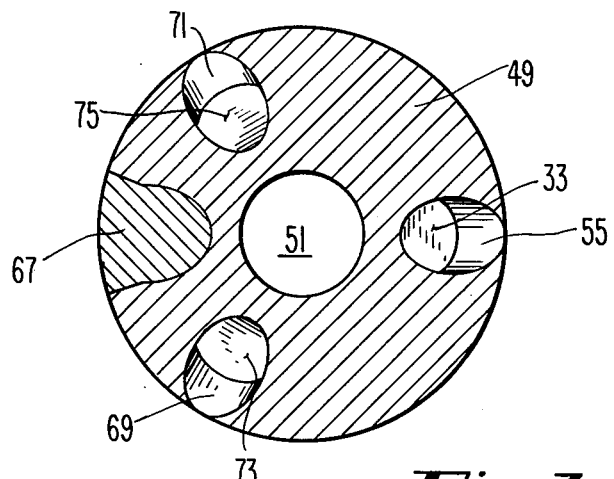
FIG. 3 shows a cross section through FIG. 2 at line 3—3.

FIG. 3 shows a cross section along line 3—3 of FIG. 2. In FIG. 3 the section 49 is shown with the central aperture 51, the photosensitive device 33 and plug 67 shown, all of which were discussed above. In addition, in FIG. 3, the apertures 69 and 71 are shown with photosensitive devices 73 and 75 therein. The apertures 69 and 71 are angularly formed apertures and hold a color filter, an infrared filter and respectively the photosensitive devices 73 and 75 in an arrangement similar to the one shown in FIG. 2 for aperture 55. In the preferred embodiment the apertures 55, 69 and 71 are 120° apart.

What I claim is:

1. A scanning head for transmitting white light to an area of a sheet of material, which area is characterized by a single color, in order to have part of the transmitted light absorbed thereby and the remainder of said light reflected and monitored so that said color and its optical density can be determined comprising in combination: housing means having a substantially hollow center section; a source of white light disposed in said hollow center section; a lens arrangement disposed in said hollow center section to direct light from said light source to a small section of said area characterized by a single color; first, second and third light filter means disposed in said housing a substantial distance one from the other and further disposed to simultaneously receive said reflected light and each respectively formed to only pass a different one of red, green and blue light reflected from said area characterized by said single color; and first, second and third photosensitive devices respectively disposed to receive the filtered light from a different but associated one of said first, second and third light filter means to produce simultaneously three electrical signals each of which is indicative of the optical density of a different one of the colors cyan, magenta and yellow which is present at said area.

2. A scanning head according to claim 1 wherein said lens arrangement includes an aperture disposed in close proximity to said source of light and further includes a pair of lenses.

3. A scanning head according to claim 1 wherein said first, second and third filters are spaced 120° from one another.

4. A scanning head according to claim 1 wherein said first, second and third filters are secured respectively in first, second and third angularly formed apertures which open into said hollow center section.

5. A scanning head according to claim 4 wherein each of said first, second and third filters is secured in its associated angularly formed aperture by an "O" ring.

6. A scanning head according to claim 1 wherein there is further included between each of said first, second and third filters and said first, second and third photosensitive devices, respectively first, second and third infrared light filters.

* * * * *